United States Patent [19]

Raffoni

[11] Patent Number: 4,681,498

[45] Date of Patent: Jul. 21, 1987

[54] CLIP FASTENER FOR CORNER JOINTING SECTION PROFILE ELEMENTS

[76] Inventor: Giuseppe Raffoni, Via Domenico Bolognesi 24, Forlí, Italy

[21] Appl. No.: 837,895

[22] Filed: Mar. 10, 1986

[30] Foreign Application Priority Data

Mar. 12, 1985 [IT] Italy .................. 14714/85[U]

[51] Int. Cl.⁴ ............................................. F16B 15/00
[52] U.S. Cl. ................................. 411/461; 411/912; 411/478; 403/402; 403/294
[58] Field of Search ............... 403/401, 402, 294, 283; 411/912, 461, 478

[56] References Cited

U.S. PATENT DOCUMENTS 1,959,360  5/1934  Heyser ..................... 411/461 X
2,398,603  4/1946  Soderberg ................. 403/401 X

FOREIGN PATENT DOCUMENTS 877266  9/1942  France ........................ 411/461

Primary Examiner—Andrew V. Kundrat
Attorney, Agent, or Firm—Guido Modiano; Albert Josif

[57] ABSTRACT

The clip fastener comprises two mutually substantially perpendicular walls forming a corner and two ribs protruding perpendicularly with respect to the walls. The ribs are arcuate, and each have an intermediate portion which is located at a greater distance from the corner than end portions thereof.

4 Claims, 13 Drawing Figures

CLIP FASTENER FOR CORNER JOINTING SECTION PROFILE ELEMENTS

BACKGROUND OF THE INVENTION

This invention relates to a clip fastener for corner jointing section profile element, particularly useful in making picture frames, framings, and the like.

In making picture or the like frames of wood, the frame strips are corner jointed together by means of sheet metal clip fasteners which are driven in astride the seam across the mating bevelled ends of the strips.

To better exemplify the state of the art, reference will be made to FIGS. 1 to 4 of the accompanying drawings, which show a commercially available clip fastener.

PRIOR ART OF THE DRAWINGS

In FIG. 1, the clip fastener is generally indicated at 1 and comprises a steel blade bent to form two mutually perpendicular walls 2,3 and two marginal ribs or beads 4,5 perpendicular to the walls and extending outwards, thereby the clip assumes a substantially W-shaped profile. When two strips 6,7 are to be jointed together which are cut, for example, to a 45° bevel to fit square to each other, clip fasteners 1 are driven in astride the seam 8 formed by the mating strip ends, such that the corner 9 between the walls 2,3 will lie on the seam line.

For easier driving, a wavy edge of the clip is sharpened as at 10.

Considerable difficulties have been encountered in holding the strips against each other along the seam line due to irregularites in the strip bevel and poor linearity of the strips.

In an effort to remedy this, clip fasteners have been proposed which taper slightly toward the opposite side from the sharpened side, as shown in FIG. 3, but the attempt has been only partially successful, because the strips would be only brought together on the side from which the clips are driven in (see FIG. 4). On the exposed face of the strips, there still remains an aesthetically objectionable gap. The reason for this trouble is to be attributed to the higher pressure exerted by the clip on the strips at its tapering end.

SUMMARY OF THE INVENTION

Accordingly, this invention seeks to provide a clip fastener which can reduce the formation of gaps at the seam between the profile elements.

This object is achieved by a clip fastener for corner jointing section profile elements comprising two mutually substantially perpendicular walls, forming one corner, and two ribs protruding substantially perpendicularly with respect to said walls, said walls and said ribs defining a cutting edge and an opposite edge having a substantially W-shaped profile, wherein according to the improvement each of said ribs comprises an intermediate portion and opposed end portions, said opposed end portions having said cutting and opposite edges located at a greater distance from said corner than said intermediate portion.

Further features will be more clearly understood from the following description, with reference to the accompanying drawings, where:

DESCRIPTION OF THE PREFERRED EMBODIMENTS

Figure 2:
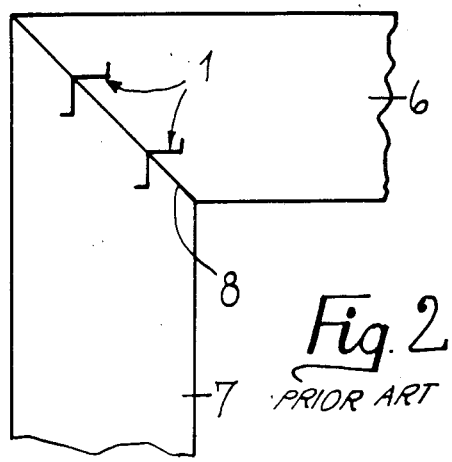
FIGS. 1-4 illustrate the prior art clip fastener.
Figure 1:
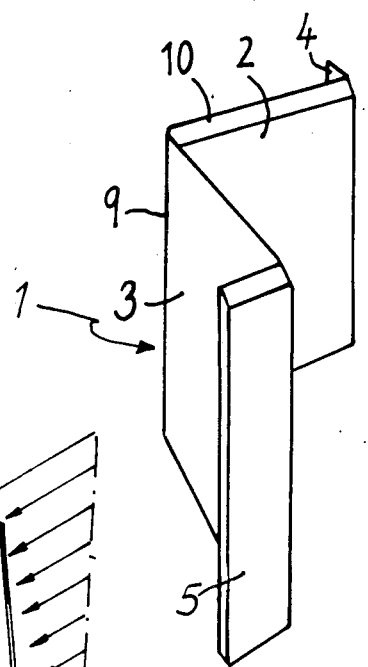
Figure 3:
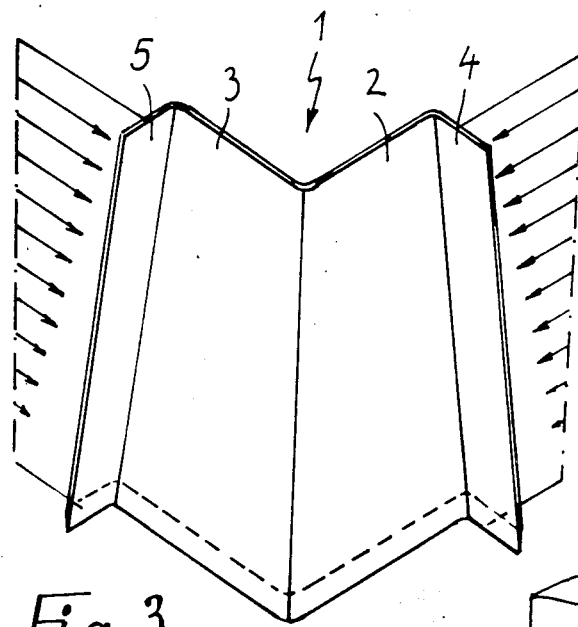
Figure 4:
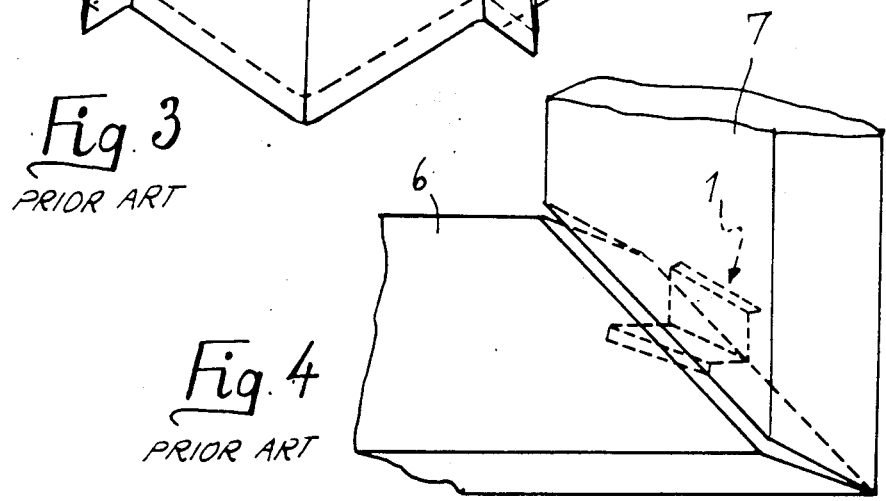

Throughout the illustrations of clip fastener in FIGS. 5-13, like parts of the clip fastener shown in FIG. 1 are identified by the same reference numerals.

Figure 5:
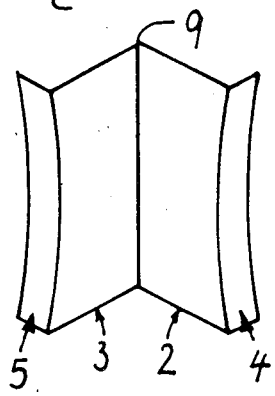
FIGS. 5-13 show perspective views of various embodiments of the clip fastener according to the invention.

As clearly illustrated in the drawings the clip fastener of the invention, shown in FIG. 5 has ribs 4,5 in the form of arcs of a circle with their intermediate arcuate portions converging towards other corner 9.

Obviously, the upper edge of the walls 2,3 can be acted on for causing the fastener to be driven into the elements to be jointed, whilst the edge lying opposite thereto may be a sharpened cutting edge for facilitating insertion of the fastener into the elements to be jointed together.

Figure 6:
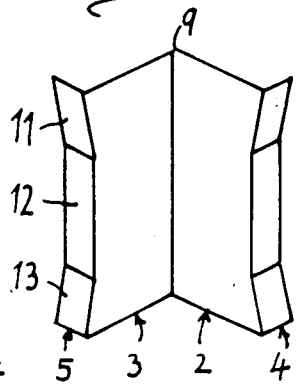

In FIG. 6, the rib's intermediate portion is defined by three flat faces 11,12,13 of which the middle one 12 lies parallel to the corner 9, whereas the end faces 11,13 are set to diverge from the corner 9.

Figure 7:
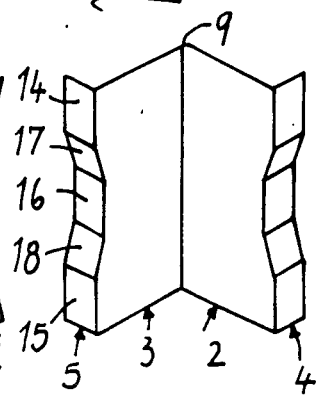

In FIG. 7, each rib has five faces 14-18, of which the end faces 14,15 are coplanar to each other and protrude further than the middle face 16 with respect to the corner 9. The middle face 16 is radiused to the adjacent faces by intermediate diverging faces 17,18 with respect to the corner 9.

Figure 8:
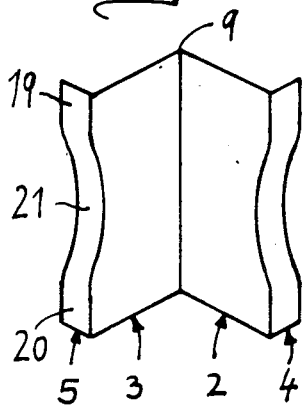

In FIG. 8, each rib is comprised of two end faces 19,20 which are coplanar and parallel to the corner 9, each being radiused to each other by an intermediate portion or zone 21 which defines an arc of a circle having a arcuate portion extending towards the corner 9.

It should be noted that the clip fasteners of FIGS. 5-8 are symmetrical to a centerplane across the corner, thereby a clamping force will act on the middle area of the clip, ensuring a close fit along the seam between the profile elements.

Occasionally, however, due to the differentiated shapes of the profiled elements' cross-sections, it may be necessary to shift the point of action of the clamping force more toward one face of the elements than the other.

Figure 9:
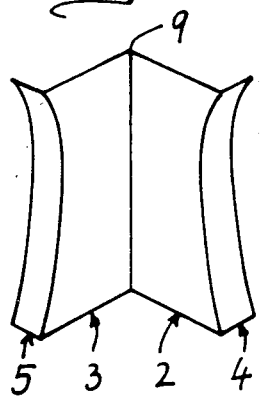
Figure 10:
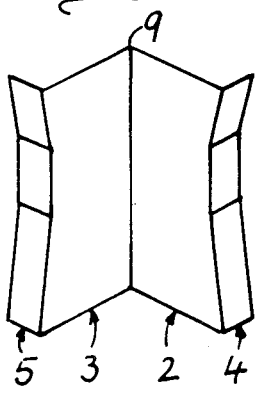
Figure 11:
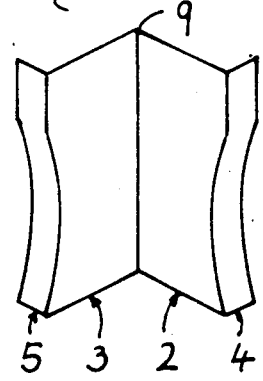

FIGS. 9-11 show approaches where the centre zones of the ribs intermediate arcuate portions are shifted toward the cutting edge both in the instance of arcuate (FIG. 9), faceted (FIG. 10), and mixed ribs (FIG. 11).

Figure 12:
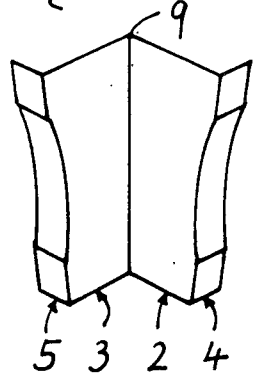

A similar effect is attained by narrowing the width of the clips towards the opposite end from the driving one (FIG. 12).

Figure 13:
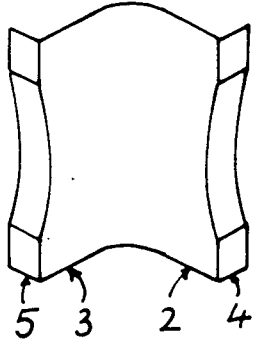

Of course, the innovative concept also applies to a clip wherein the walls 2,3 are interconnected arcuately (FIG. 13).

What is claimed is:

1. A clip fastener for corner jointing section profile elements comprising two mutually substantially perpendicular walls, forming one corner, and two ribs protruding substantially perpendicularly with respect to said walls, said walls and said ribs defining a cutting edge and an opposite edge have a substantially W-shaped profile, wherein according to the improvement each of said ribs comprises an intermediate portion and opposed end portions, said opposed end portions having said cutting and opposite edges located at a greater distance from said corner than said intermediate portion.

2. A clip fastener according to claim 1, wherein said intermediate portions of said ribs have an arcuate portion converging toward said corner.

3. A clip fastener according to claim 1, wherein said intermediate portion of said ribs comprise a flat face and said end portions diverge toward said cutting edge and opposite edge respectively.

4. A clip fastener according to claim 1, wherein said intermediate portion comprises a center zone located nearer to said cutting edge than said opposite edge.

* * * * *